(12) United States Patent
Hui et al.

(10) Patent No.: US 7,298,717 B2
(45) Date of Patent: Nov. 20, 2007

(54) METHOD AND APPARATUS FOR PROVIDING TRANSMIT DIVERSITY WITH ADAPTIVE BASIS

(75) Inventors: Yan Hui, San Diego, CA (US); Eko N. Onggosanusi, Allen, TX (US); Gibong Jeong, Stanford, CA (US); Anand Ganesh Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 961 days.

(21) Appl. No.: 10/077,084

(22) Filed: Feb. 15, 2002

(65) Prior Publication Data

US 2003/0156572 A1 Aug. 21, 2003

(51) Int. Cl.
- *H04Q 7/00* (2006.01)
- *H04Q 7/20* (2006.01)
- *H04B 7/10* (2006.01)

(52) U.S. Cl. ............... 370/329; 370/333; 370/347; 370/542; 370/215; 375/347; 455/436

(58) Field of Classification Search ............ 370/389, 370/392, 394, 401, 474, 465, 333, 334; 714/748, 714/749; 375/347
See application file for complete search history.

(56) References Cited

U.S. PATENT DOCUMENTS

| 5,689,439 | A  | * | 11/1997 | Weerackody et al. | 370/329 |
|---|---|---|---|---|---|
| 6,157,612 | A  | * | 12/2000 | Weerackody et al. | 370/215 |
| 6,370,129 | B1 | * | 4/2002 | Huang | 370/329 |
| 6,377,631 | B1 | * | 4/2002 | Raleigh | 375/299 |
| 6,377,632 | B1 | * | 4/2002 | Paulraj et al. | 375/299 |
| 6,999,472 | B2 | * | 2/2006 | Hamalainen et al. | 370/468 |
| 2002/0165626 | A1 | * | 11/2002 | Hammons et al. | 700/53 |
| 2002/0196842 | A1 | * | 12/2002 | Onggosanusi et al. | 375/148 |
| 2003/0016637 | A1 | * | 1/2003 | Khayrallah et al. | 370/329 |
| 2005/0020215 | A1 | * | 1/2005 | Hottinen | 455/101 |
| 2005/0078761 | A1 | * | 4/2005 | Hottinen et al. | 375/267 |

OTHER PUBLICATIONS

Chase, David, "Code Combining—A Maximum-Likelihood Decoding Approach for Combining an Arbitrary Number of Noisy Packets," IEEE Transactions on Communications. vol. COM-33, No. 5, May 1985.

Lucent Technologies, "Preliminary Link Level Results for HSDPA Using Multiple Antennas," TSG-R WG1 document, TSGR1#16(00) 1218, Oct. 2000, Pusan, Korea.

FUJITSU, "Link Level Simulation Results for HSDPA: Comparison Between MIMO and Tx Diversity," TSGR1#19(01) 0286, Feb.-Mar. 2001, Las Vegas, Nevada.

(Continued)

*Primary Examiner*—Edan D. Orgad
*Assistant Examiner*—Venkatesh Haliyur
(74) *Attorney, Agent, or Firm*—Ronald O. Neerings; Wade J. Brady, III; Frederick J. Telecky, Jr.

(57) ABSTRACT

A method and apparatus are provided that uses the feedback information from an ARQ signal that is received to control the transmit diversity of a transmitter. The method provides for improved performance over some existing ARQ plus open loop transmit diversity schemes in terms of bit-error rate for a given Eb/No. Furthermore, the method does not require extra signaling used by closed loop TD schemes.

9 Claims, 4 Drawing Sheets

OTHER PUBLICATIONS

Texas Instruments, "Double-STTD Scheme for HSDPA Systems with Four Transmit Antennas: Linx Level Simulation Results," TSG-R WG1 document, TSGR1#20(01)0458, May 2001, Busan, Korea.

Texas Instruments, "Improved Double-STTD Schemes Using Asymmetric Modulation and Antenna Shuffling," TSG-R WG1 document, TSGR1#20(01)0459, May 2001, Busan, Korea.

Texas Instruments, "Double-STS Scheme for 1xEV-DV Systems with Four Transmit Antennas: Link Level Simulation Results," C50-20010820-007, Aug. 2001, Portland, Oregon.

LG ELECTRONICS, et al., "Updated Joint Physical Layer Proposal for 1xEV-DV," 3GPP2-C50-20010611-009. Jun. 2001, Vancouver, BC, Canada.

3rd Generation Partnership Project, Technical Specification Group Radio Access Network; "Physical Layer Aspects of UTRA High Speed Downlink Packet Access." 3GPP TR 25.848, V4.0.0. Aug. 2001.

MOTOROLA, et al., "1XTREME Physical Specification for Integrated Data and Voice Services in cdma2000 Spread Spectrum Systems," C00-20010611-007, Jun. 2001.

* cited by examiner

METHOD AND APPARATUS FOR PROVIDING TRANSMIT DIVERSITY WITH ADAPTIVE BASIS

TECHNICAL FIELD

This invention relates in general to wireless communications, and more particularly to an ARQ (Automatic Repeat Request) using transmit diversity with adaptive basis or other smart antenna systems.

BACKGROUND

Improving system throughput and capacity is one of the main goals for high-speed wireless systems, such as those proposed for the High Speed Downlink Packet Access (HSDPA) and 1xEV-DV which are part of the $3^{rd}$ Generation Partnership Project (3GPP) and 3GPP2 standards bodies, respectively. Technologies, such as adaptive modulation and coding schemes, Hybrid-ARQ, code combining, smart antennas, etc., are being investigated and proposed for these new standards to achieve this goal.

ARQ is an implicit adaptation technique in which receiver acknowledgments regarding the transmitted packets are used for re-transmission decisions. Hybrid-ARQ (H-ARQ) is one form of ARQ schemes in which one of code combing methods is usually used. Time diversity offered by Hybrid ARQ has been shown to have the capability of improving system throughput. In the 1xEV-DV and HSDPA proposals, for example, Chase combining (i.e. symbol combining, also referred to as H-ARQ-type-III with one redundancy version) and Incremental Redundancy (IR), are used together with ARQ to achieve higher throughput on the forward link by exploring this time diversity. Transmit Diversity (TD) has been proposed for wireless standards such as the IS-2000 and Wideband Code Division Multiple Access (WCDMA). In IS-2000, for example, two open loop transmit diversity schemes have been adopted, i.e. Orthogonal Transmit Diversity (OTD) and Space Time Spreading (STS). In WCDMA, both open loop TD, i.e. Space Time Transmit Diversity (STTD), and closed loop TD schemes have been adopted. In the HSDPA and the 1xEV-DV proposals, different open loop and closed loop transmit diversity schemes are under consideration.

Closed loop transmit diversity requires feedback information from the receiver to achieve better performance compared to open loop transmit diversity. However, the quantized feedback information with reasonable degradation introduces unwanted overhead. Open loop TD can be considered as special case of closed loop TD in which feedback is a constant value. Many open and closed loop transmit diversity schemes have been studied. For example, a four transmit antenna system of the double-STTD or (DSTTD) scheme has been proposed where two distinct streams of data are encoded using two STTD encoders and transmitted by 4 antennas. A closed loop TD scheme with a four transmit antenna system of the DSTTD has also been proposed where an estimation of the co-variance matrix is required in order to find the best basis and the feedback is required to signal to the transmitter which basis would be used. A discussion of a prior art DSTTD system can be found in an article entitled, "Increasing data rate over wireless channels", by A. Naguib, N. Seshadri and A. R. Calderbank, IEEE Signal Processing, pp. 76-92, May 2000.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
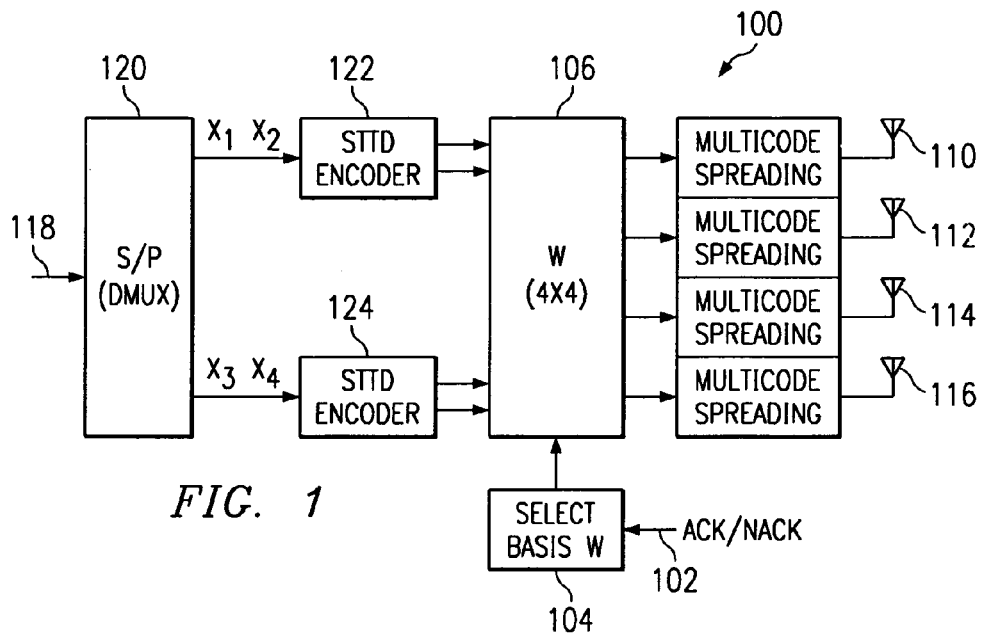
FIG. 1 shows a 4 transmit antenna DSTTD transmitter in accordance with one embodiment of the invention.

While the specification concludes with claims defining the features of the invention that are regarded as novel, it is believed that the invention will be better understood from a consideration of the following description in conjunction with the drawing figures, in which like reference numerals are carried forward.

The present invention combines transmit diversity and ARQ schemes to explore the time diversity provided by ARQ and transmit diversity from multiple transmit and multiple receive antennas. In this method, the feedback information for ARQ is used to control the transmit diversity schemes or TD basis for (re)transmissions. By doing so, the performance is improved as compared to techniques like H-ARQ plus open loop TD schemes as well as H-ARQ schemes using open loop TD with randomly selected basis from a pre-determined set. This method does not add extra feedback information required by the previously mentioned closed loop TD schemes.

For an M transmit antenna and 1 receive antenna system, the channel can be represented by h, which is an M×1 vector representing M channels corresponding to M transmit antennas. The received signal is $$r=Hs+n$$

where H is an M×M channel matrix and is related to h, s is a modulated symbol and n is white Gaussian additive channel noise. It should be noted that H is an M×M matrix for a TD system that can achieve full diversity, and it can be an N×M matrix for a TD system that does not achieve full diversity, where N is the number of symbols TD encoded at one time. For example, in FIG. 1 N=4 (output of S/P 102 is X1-X4). Different open loop or closed loop TD schemes can be represented by applying different weighting factors, or basis w, to the transmitter in order to generate different channel matrices. As a result, channel h becomes $$\hat{h}=wh,$$

where w is an M×M matrix. w can simply be either a weighting factor matrix, for example that derived from channel information in a closed loop TD system, or from a set of basis which spans to some space. The received signal can then be represented using the corresponding channel matrix $\hat{H}(\hat{h})$ by $$r=\hat{H}s+n.$$

If perfect channel estimation is assumed at receiver, the output from Maximal Ratio Combining (MRC) combiner is $$y=\hat{H}^H\hat{H}s+\hat{H}^Hn, \quad \text{(Equation 1)}$$

where $\hat{H}^H$ denotes complex conjugate (Hermitean conjugate) transpose of the channel matrix. If w=α·I with I being the identity matrix, or any constant matrix, (Equation 1) represents open loop transmit diversity schemes. If w changes according to an order and from a basis set, both of which are pre-determined by the transmitter and receiver, (Equation 1) then represents open loop TD with adaptive basis. It is obvious that conventional open loop TD scheme is a special case of open loop TD scheme with adaptive basis randomly selected from a basis set.

When H-ARQ is used in a system with transmit diversity, the output of the MRC for the retransmission is combined with that of the previous transmission. The output of code combining is $$y=\left(\sum_i \alpha i H_i^H H_i\right)s+\left(\sum_i \alpha i H_i^H H_i\right)n, \quad \text{(Equation 2)}$$

where i is the retransmission index and $\alpha_i$ is the weight for code combining. No matter whether the channel changes or not, the transmit signal is not formed differently, i.e. $H_i$ changes for different i only due to the channel conditions.

Closed loop transmit diversity is achieved by forming the transmit signal via w on multiple antennas in such a way that certain cost function derived from Equation 1 is optimized, such as maximizing SNR, or equivalently minimizing BER. In the closed loop TD, the basis w is determined by the channel information and is feedback from the receiver to the transmitter. Clearly, open loop TD can be viewed as a special case of closed loop TD where w is not optimized with respect to the channel information feedback from the receiver. Closed loop TD schemes usually have the performance advantage over open loop TD schemes due to the feedback information that is not available for the latter. However, the performance can be degraded significantly when the feedback information is quantized using a smaller number of bits.

Since the Acknowledgement (ACK) or Negative-Acknowledgement (NACK) implies the channel condition to a certain degree, this can be taken advantage of and used to form a transmit signal in a TD system. In accordance with the invention a basis set, $\{w_i\}$ is defined along with its order. The basis set and its order are pre-determined between transmitter and receiver. When an ACK is received from the receiver, the basis used for the previous transmission remains the same. When a NACK is received, a new basis in the set is used on both the transmitter and receiver. Now, Equation 2 becomes:

$$y=\left(\sum_i \alpha i \hat{H}_i^H \hat{H}_i\right)s+\left(\sum_i \alpha i \hat{H}_i^H \hat{H}_i\right)n$$

where $\hat{H}_i$ is a channel matrix related to $w_i$. The basis set and its order are pre-determined by the transmitter and receiver. The order can also be calculated from for example using a frame counter, index, or selection algorithm known to both the transmitting and receiving devices. It should be noted that this method can easily be extended to other ARQ schemes including H-ARQ schemes, such as incremental redundancy. As an illustration of the present invention, it will be illustrated how a H-ARQ acknowledgement is used to perform basis selection on a multiple transmit and receive antenna system. A four transmit antenna system of the double-STTD (DSTTD) scheme and symbol combining based H-ARQ are used as an illustrative example. Even though a four-antenna DSTTD system is used as an example to illustrate how the system works, this invention is not limited to such TD schemes and antenna configurations, but is applicable to a wide range of TD configuration and schemes.

A transmitter block diagram 100 for a four antenna DSTTD system in accordance with the present invention is shown in FIG. 1. The incoming data 118 is de-multiplexed into 2 streams by S/P block 120. The two data streams are then STTD encoded by two separate STTD encoders 122 and 124. The four output streams from the STTD encoders 122 and 124 are permutated by the basis w 106 before spreading and modulation. The transmitter 100 includes a TD basis selection block 102 which in response to receiving an ARQ signal such as an ACK/NACK 102 or other ARQ message selects which basis to use in the TD encoding from the basis set block 106 that has stored therein in this example a set of 4×4 basis matrices. Together, the TD basis selection block 102 and the basis set block 106 help form a transmit diversity controller which in responsive to receiving the ARQ signal 102 automatically determines if a different transmit diversity configuration is required.

Different basis can be applied to this TD structure. The simplest one would be different permutations of the 4×4 identity matrix and it results in 24 different permutations. Among them, there are only six different permutation matrices as follows, $$w_1=\begin{bmatrix}1&0&0&0\\0&1&0&0\\0&0&1&0\\0&0&0&1\end{bmatrix}, w_2=\begin{bmatrix}1&0&0&0\\0&1&0&0\\0&0&0&1\\0&0&1&0\end{bmatrix},$$

$$w_3 = \begin{bmatrix} 1 & 0 & 0 & 0 \\ 0 & 0 & 1 & 0 \\ 0 & 1 & 0 & 0 \\ 0 & 0 & 0 & 1 \end{bmatrix}, w_4 = \begin{bmatrix} 1 & 0 & 0 & 0 \\ 0 & 0 & 0 & 1 \\ 0 & 1 & 0 & 0 \\ 0 & 0 & 1 & 0 \end{bmatrix},$$

$$w_5 = \begin{bmatrix} 1 & 0 & 0 & 0 \\ 0 & 0 & 1 & 0 \\ 0 & 0 & 0 & 1 \\ 0 & 1 & 0 & 0 \end{bmatrix}, w_6 = \begin{bmatrix} 1 & 0 & 0 & 0 \\ 0 & 0 & 0 & 1 \\ 0 & 0 & 1 & 0 \\ 0 & 1 & 0 & 0 \end{bmatrix}.$$

In the present invention, data symbols from each of the two STTD encoders 122 and 124 are transmitted using the antenna (110-116) selected by the corresponding 1's in the basis matrix. They can be used in different retransmissions in a pre-determined order on both transmit and receive devices if desired. Other basis can also be used.

Figure 2:
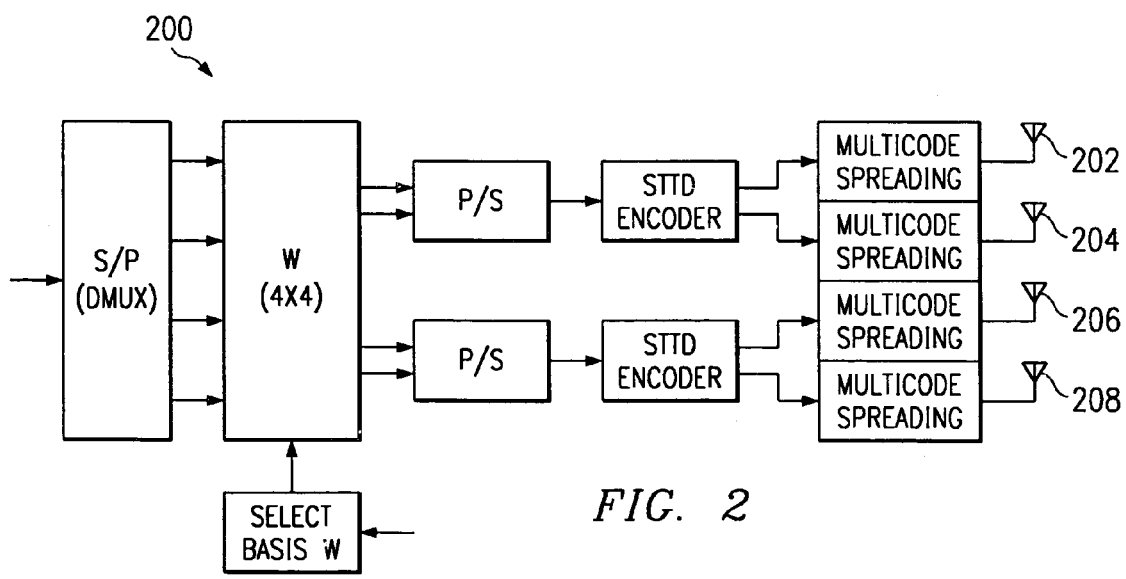
FIG. 2 shows a block diagram of a generalized DSTTD transmitter used in another embodiment of the invention.
Figure 3:
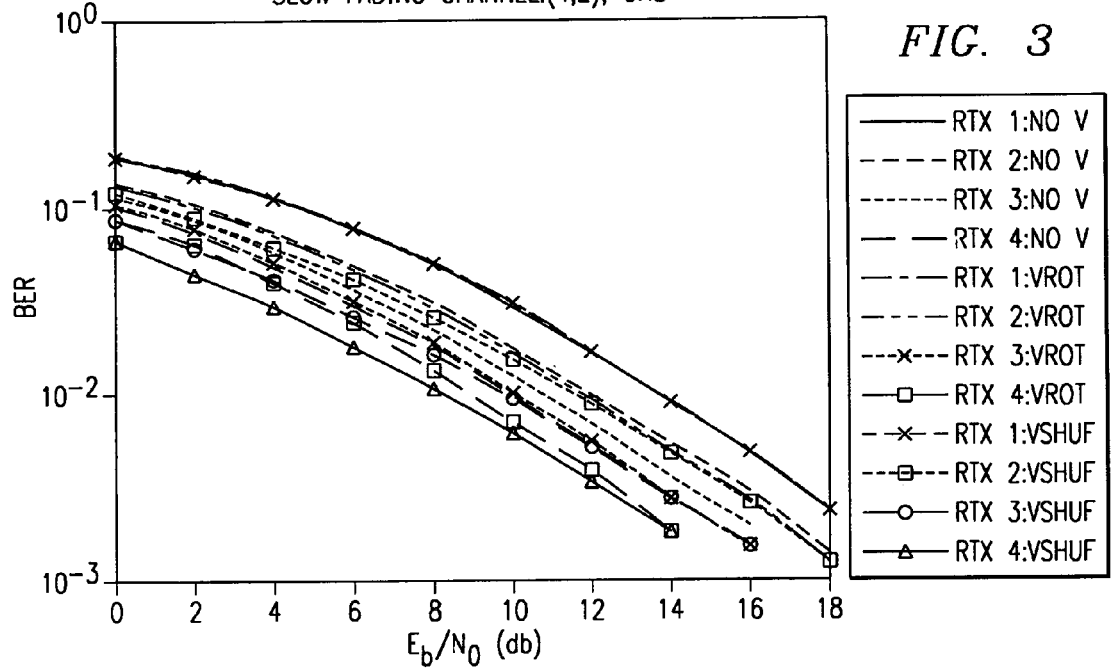
FIG. 3 shows a graph comparing the method of the present invention using a 4 transmit antennas and 2 receive antennas ((4,2) configuration) and pre-determined basis set with the symbol combining based H-ARQ and DSTTD with randomly selected basis from the same pre-determined basis set in a correlated channel.
Figure 4:
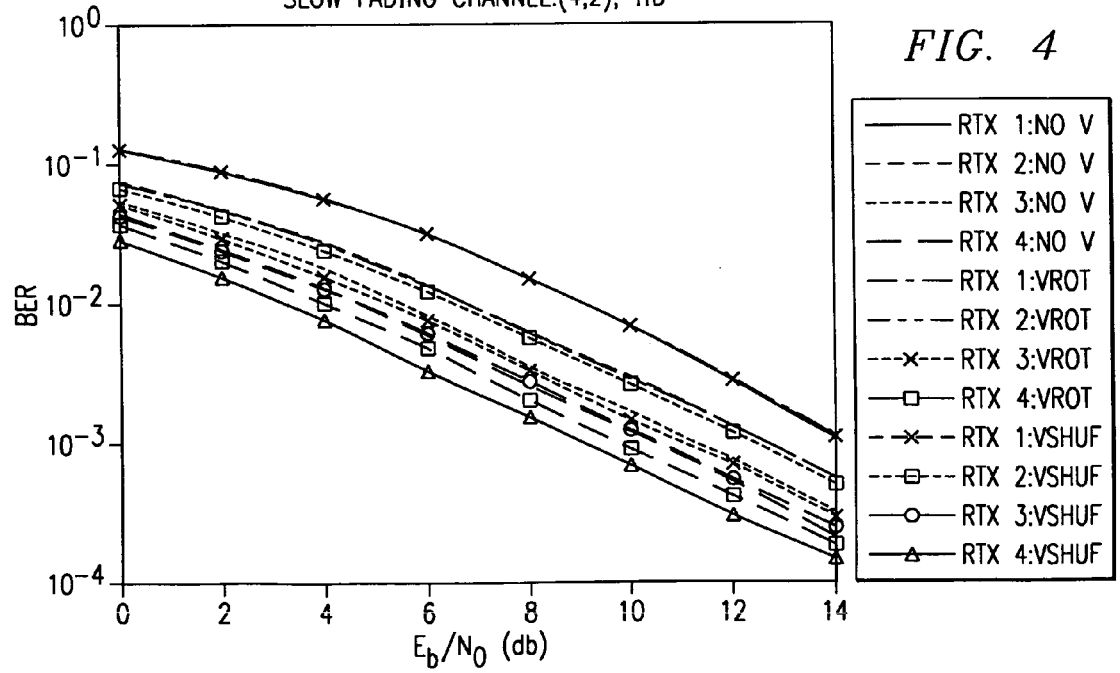
FIG. 4 shows a graph comparing the method of the present invention using a (4, 2) configuration and pre-determined basis set with the symbol combining based H-ARQ and DSTTD with randomly selected basis from the same pre-determined basis set in an uncorrelated channel.
Figure 5:
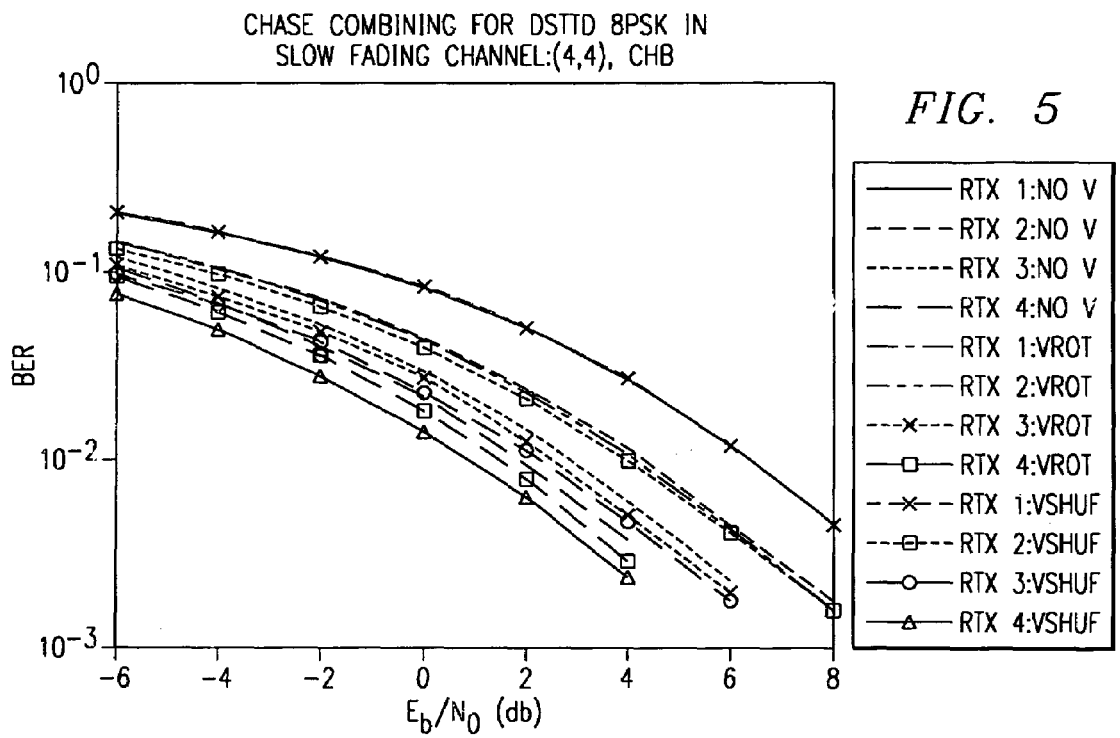
FIG. 5 shows a graph comparing the method of the present invention using a (4,4) configuration and pre-determined basis set with the symbol combining based H-ARQ and DSTTD with randomly selected basis from the same pre-determined basis set in a correlated channel.
Figure 6:
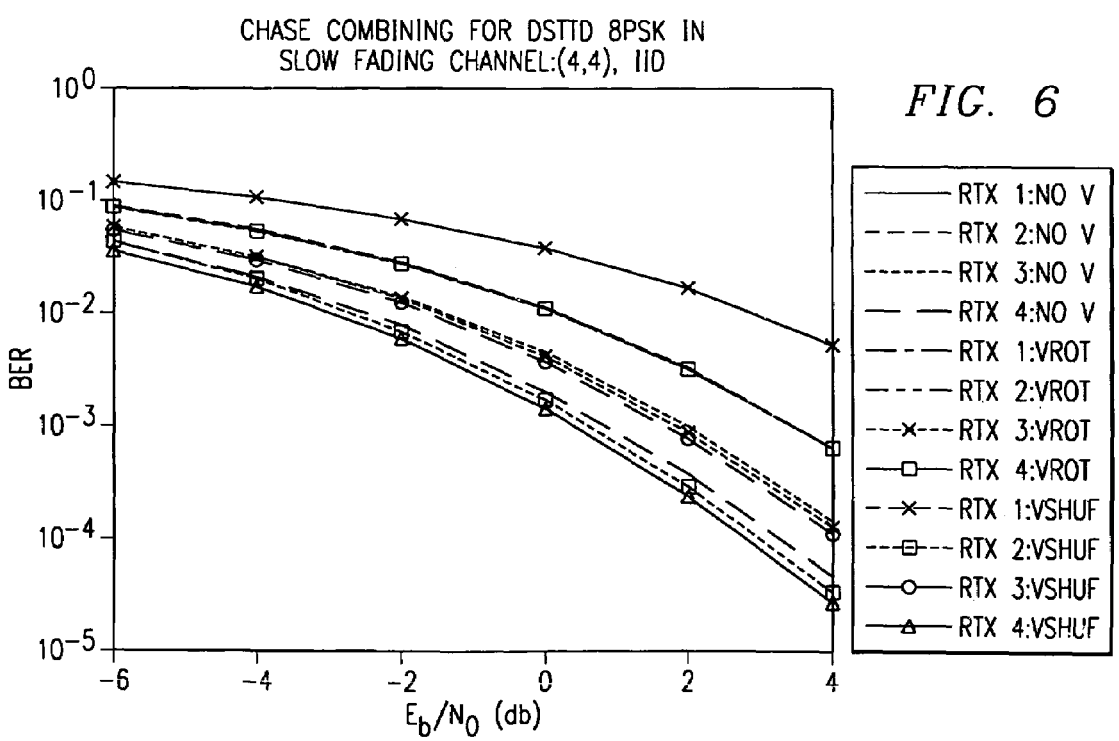
FIG. 6 shows a graph comparing the method of the present invention using a (4,4) configuration and pre-determined basis set with the symbol combining and DSTTD with randomly selected basis from the same pre-determined basis set in an uncorrelated channel.

A more general approach is to use a generalized DSTTD and adaptively change basis for each transmission and retransmissions. An illustrative example of such a system 200 with 4 transmit antennas 202-208 is shown in FIG. 2 and an example of the basis in this particular example is a rotation matrix as follows, $$w_i = \begin{bmatrix} \cos\phi_i & 0 & -\sin\phi_i & 0 \\ 0 & \cos\phi_i & 0 & -\sin\phi_i \\ \sin\phi_i & 0 & \cos\phi_i & 0 \\ 0 & \sin\phi_i & 0 & \cos\phi_i \end{bmatrix}. \quad \text{(Equation 3)}$$

where $\phi_i$ is chosen from $\{0, \pi/8, \pi/4, 3\pi/8\}$. The major difference between FIG. 1 and FIG. 2 is that the basis is applied before the STTD encoding in the generalized DSTTD in FIG. 2 while it is applied after STTD encoding in FIG. 1. Although two different types of basis have been shown above, the present invention can use many different types of basis for the transmissions and/or retransmissions in response to receiving an ARQ signal, such as an ACK or a NACK. The present invention can also use different TD schemes, configurations, and number of transmit antennas other than a 4 transmit antenna DSTTD system.

FIGS. 3-6 shows simulation results of the proposed method with 4 transmit antennas and 2 or 4 receive antennas under an Identical Independent Distribution (i.i.d.) channel and a correlated channel. The results are compared with prior art symbol combining based H-ARQ systems using DSTTD with adaptive basis randomly selected from a pre-determined set. Maximum number of retransmission is set to 4, and 4 out of 6 permutation matrices are used. As a further comparison, results using the structure shown in FIG. 2, and the basis given by (Equation 3) are also shown in the graphs.

As shown in FIGS. 3-6, in a correlated channel with a (4,2) system and 4 retransmissions, the proposed method with permutation matrices gives about 2 dB gain at 1% BER over the symbol combining based H-ARQ using DSTTD with adaptive basis randomly selected from a pre-determined set. For 3 retransmissions, there is still about 1 dB gain. With the basis in (Equation 3), the gains are smaller, 1.2 dB and 0.8 dB, respectively. In i.i.d channel, the proposed method with permutation matrices gives about 1.2 dB gain at 1% BER over the symbol combining based H-ARQ using DSTTD with adaptive basis randomly selected from a pre-determined set. For a (4,4) system in a correlated channel, the gains are 1 dB and 0.6 dB for 4 and 3 retransmissions, respectively, while in an i.i.d. channel, the gains are 0.5 dB and 0.2 dB at 1% BER, respectively.

Figures 7, 8:
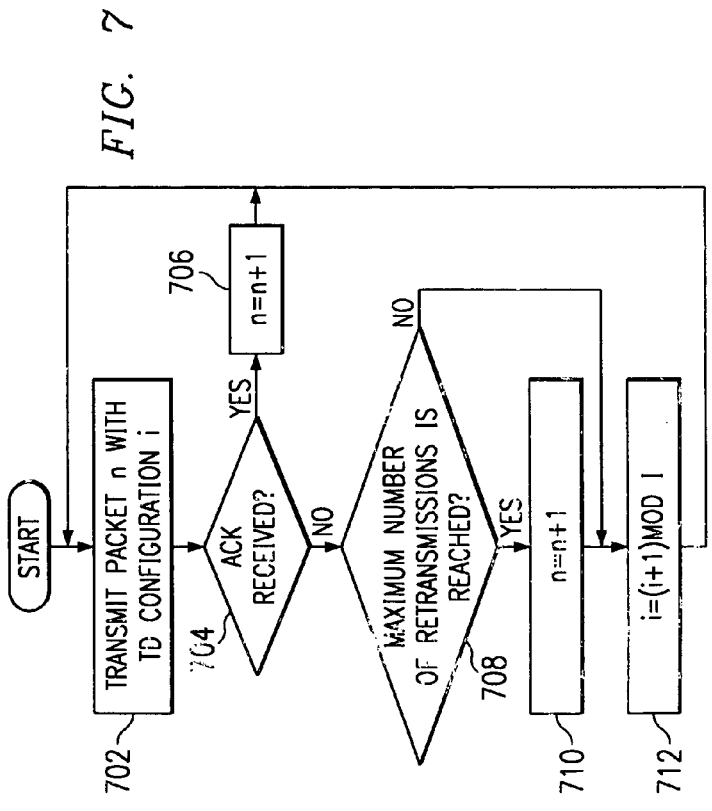
FIG. 7 shows a simplified flowchart highlighting some of the steps that are taken in accordance with the invention.
FIG. 8 shows a block diagram of a communication system having two communication devices that operate using the present invention.

In FIG. 7 there is shown a flowchart highlighting some of the steps taken in accordance with the preferred embodiment. In step 702, a communication device transmits a packet (e.g., packet n) to a second communication device using a first (labeled i) TD configuration. In step 704, it is determined if an acknowledgment is received from the second communication device. If an acknowledgment (ACK) of a successful reception of packet "n" is received, in step 706, the first communication device increments its packet counter and the next packet (e.g., n+1) packet is transmitted in step 702. The TD configuration is not changed for the first and second communication devices. If however in decision step 704 it is determined that the second communication device failed to successfully receive packet "n" it sends a NACK to the first communication device.

In response to the NACK, the routine moves to step 708 where the first communication device determines if the maximum number of retransmissions has been reached. This can be determined by comparing the current attempt number to a stored threshold found in the first communication device. If the maximum number of retransmission for the packet has not been reached, the TD configuration is changed in step 712, and the routine loops back to step 702. If however, the maximum number of retransmission attempts has been reached as determined in step 708, the routine moves to step 710 where the packet counter (found in the communication device) is incremented so the next packet (n+1) is prepared for transmission. Again, the routine adjusts the TD configuration using a predetermined algorithm, which in this example is set at "i=(i+1) mod I, where i is an index of TD basis and I is the total number of basis in the pre-determined TD basis set, both of which are known to both the first and second communication devices and help the devices determine which basis to apply. The second communication device also adjusts its TD configuration for its receiver unit upon transmitting the NACK to the first communication device.

Referring now to FIG. 8, there is shown a communication system including a first communication device 802 and a second communication device 804. Both communication devices 802 and 804 preferably comprise transceivers having both transmit and receive capabilities. The ARQ ACK/NACKS 806 are transmitted by the transmitter of the second communication device 804 and received by the receiver found in the first communication device 802. First communication device 802 includes a conventional channel encoder coupled in this example to a H-ARQ buffer 808, which includes memory and the associated controller used to perform the H-ARQ scheme being employed. The output of the H-ARQ buffer 808 is coupled to a TD Encoder and the associated TD Basis Selection Control block 810 that performs the necessary steps in accordance with the present invention in response to an ACK/NACK 806 being received from the second communication device 804. The output from 810 is modulated by the Modulator Block and transmitted. The transmitter found in communication device 804 will also have the above described blocks. The transmitter found in communication device 804 can use other TD schemes or may not use any TD scheme.

The ACK/NACK information is used by the ARQ Buffer 808 and transmit diversity basis (or weighting factor) control 810 blocks found in the first communication device 802 to determine if a change in TD basis is required for a subsequent transmission and/or retransmission. Similarly, if the second communication device 804 sends out a NACK, it will correspondingly change the TD basis in the TD Decoder and the associated TD Basis Selection Control block to handle the next incoming signal in accordance with the method of the present invention. Correspondingly, the receiver section the first communication device 802 will include a similar TD decode and basis selection control block 812 like that shown in the receiver section of communication device 804. The receiver section in the first communication device 802 can use different TD schemes or may not use any TD scheme.

In summary, the method of the present invention outperforms the conventional ARQ using open loop TD with adaptive basis randomly selected from a pre-determined set in terms of bit-error-rate for a given Energy per bit/noise power spectral density (Eb/No). Furthermore, the present invention does not require extra signaling as closed loop TD systems require.

While the preferred embodiments of the invention have been illustrated and described, it will be clear that the invention is not so limited to the TD schemes, basis, and ARQ types that are used to illustrate the invention. Numerous modifications, changes, variations, substitutions and equivalents will occur to those skilled in the art without departing from the spirit and scope of the present invention as defined by the appended claims.

The invention claimed is:

1. A method for controlling transmit diversity in a first communication device operating in a system including the first communication device and a second communication device, the first and second communication devices both having stored a pre-determined basis set $\{w_i\}$, the method comprising the steps of:
   (a) transmitting a packet from the first communication device to the second communication device by a transmit Diversity (TD) scheme using a first basis from $\{w_i\}$;
   (b) using the same basis as in step (a) for the next packet to be transmitted by the first communication device if the second communication device sends an acknowledgment (ACK) to the first communication device; and
   (c) using a different basis from $\{w_i\}$ by both the first and second communication devices if the second communication device sends an negative-acknowledgment (NACK) to the first communication device in response to step (a), wherein the first communication device includes M transmit antennas and the basis is selected by both the first and the second devices from a set of M×M rotation matrices.

2. A method as defined in claim 1, wherein the first communication device includes a plurality of antennas (M) and in step (c) using a different basis by the first communication device causes the first communication device to select a different permutation of the plurality of antennas than the one used in step (a).

3. A method as defined in claim 1, wherein the first communication device uses different basis for further retransmissions if further retransmissions are required.

4. A method as defined in claim 1, wherein the second communication device uses different basis for receiving further retransmissions if further retransmissions are required.

5. A method as defined in claim 1, wherein the first and second communication devices adaptively changes the basis using a pre-determined order or using a selection algorithm known to both devices for each retransmission of a packet.

6. A method as defined in claim 1, wherein the first communication device includes M transmit antennas and the basis is selected from a set of M×M permutation matrices derived from an identity matrix.

7. A method as defined in claim 1, wherein in step (c) where the index of the new basis to be used in the first and second communication devices are derived using a frame counter or index known to both the first and second communication devices.

8. A method as defined in claim 6, wherein the order for which basis to select from a set of M×M matrices in step (c) is known by both the first and second communication devices.

9. A method as defined in claim 1, wherein the first communication device includes 4 antennas (M=4) and the matrix is defined as $$w_i = \begin{bmatrix} \cos\phi_i & 0 & -\sin\phi_i & 0 \\ 0 & \cos\phi_i & 0 & -\sin\phi_i \\ \sin\phi_i & 0 & \cos\phi_i & 0 \\ 0 & \sin\phi_i & 0 & \cos\phi_i \end{bmatrix},$$

where $\phi$ is chosen from $\{0, \pi/8, \pi/4, 3\pi/8\}$.

* * * * *